United States Patent
Bennett (10) Patent No.: US 12,397,729 B1
(45) Date of Patent: Aug. 26, 2025

(54) SIDE UNDERRIDE GUARD

(71) Applicant: HCEW IP Leasing, LLC, City of Industry, CA (US)

(72) Inventor: Jeffrey J. Bennett, South Pasadena, CA (US)

(73) Assignee: HCEW IP LEASING, LLC, City Of Industry, CA (US)

( * ) Notice: Subject to any disclaimer, the term of this patent is extended or adjusted under 35 U.S.C. 154(b) by 0 days.

(21) Appl. No.: 19/059,914

(22) Filed: Feb. 21, 2025

Related U.S. Application Data (60) Provisional application No. 63/556,257, filed on Feb. 21, 2024.

(51) Int. Cl.
*B60R 19/56* (2006.01)
*B62D 65/16* (2006.01)

(52) U.S. Cl.
CPC ............ *B60R 19/565* (2013.01); *B62D 65/16* (2013.01)

(58) Field of Classification Search
USPC ........................................ 296/180.4; 293/128
See application file for complete search history.

(56) References Cited

U.S. PATENT DOCUMENTS

| | | | |
|---|---|---|---|
| 5,507,546 A | 4/1996 | Holley | |
| 9,908,493 B1 | 3/2018 | Kiefer | |
| 10,577,033 B2 * | 3/2020 | Macherel | B62D 35/02 |
| 10,836,335 B2 | 11/2020 | Wylezinski | |
| 11,345,296 B2 * | 5/2022 | Ponder | B60R 19/565 |
| 11,691,583 B1 | 7/2023 | Bennett | |
| 11,738,704 B2 * | 8/2023 | Lee | B60R 19/023 |
| | | | 293/128 |
| 12,145,520 B1 * | 11/2024 | Draxler | B62D 21/03 |
| 2020/0269789 A1 | 8/2020 | Ponder | |
| 2022/0009436 A1 * | 1/2022 | Watson | B60R 19/565 |

* cited by examiner

*Primary Examiner* — Joseph D. Pape
(74) *Attorney, Agent, or Firm* — Cislo & Thomas, LLP (57) ABSTRACT

A side underride guard for vehicles, including trailers for tractor-trailer rigs, having a series of triangular shaped stabilizers made from a vertical section extending downwardly from the structural siderail of the trailer, a horizontal section extending from the top of the vertical section, and a diagonal section extending from the bottom of the vertical section to an inboard side of the horizontal section. A series of these stabilizers are mounted along two horizontal beams to form a triangular prism, but do not attach to crossmembers of the trailer. A pair of side underride guards are positioned on opposite sides of the trailer bed in which the two side underride guards act independently of each other.

25 Claims, 11 Drawing Sheets

SIDE UNDERRIDE GUARD

CROSS REFERENCE TO RELATED APPLICATION

This patent application claims the benefit of U.S. Provisional Patent Application Ser. No. 63/556,257, entitled "Side Underride Guard," filed Feb. 21, 2024, which application is incorporated in its entirety here by this reference.

TECHNICAL FIELD

This invention relates to vehicle accident mitigation.

BACKGROUND

Rear Underrun Protection Systems known as underride guards are rigid assemblies at the rear of vehicles including trailers and semi-trailers. The Federal Department of Transportation has mandated these assemblies through NHTSA REGULATIONS FMVSS 223 and 224 with the intention that the bars will interfere with automobiles running under such high, heavy vehicles in a rear end collision. The object of the Federal Regulations is to reduce the likelihood of impact of the vehicle frame with the automobile passenger compartment. The rigid assemblies typically include vertical brackets depending from the vehicle to support a horizontal bar extending the width thereof. The length of the bars and ground clearance are dictated by the regulations to receive the structural areas of an automobile bumper and crumple zone. The mandated clearance is enabled by the proximity of the guards to the rear wheels, making ground contact of the horizontal bar highly unlikely.

Side underride guards have not been mandated by NHTSA regulations even though there is some possibility of side underride from automobiles intersecting such high, heavy vehicles from substantial angles. Of course, nothing can avert predictable disaster at extreme impact speeds. With side underride guards, the guards, by definition, would extend to a significant distance between the vehicle front and rear wheels. Such side underride guards adhering to the NHTSA regulations for rear underride guards would make any trailer subject to recurrent high centering during normal operation. The problem of high centering is regularly encountered with aerodynamic side skirts on such vehicles, requiring a compromise between side skirt flexibility and aerodynamic effectiveness. U.S. Pat. No. 11,691,583, incorporated here in its entirety, solves this problem. However, this underride guard adds significant weight and structure to the trailer.

For the foregoing, there is a need for improved underride guards that reduce the added weight to the trailer without compromising structural integrity and safety.

SUMMARY

The present invention is directed to side impact guard systems, such as a side underride guard for vehicles, including trailers for tractor-trailer rigs. In a first aspect of the present invention, the side underride guard has an effective ground clearance on flat ground that is above bumpers and tires of the standard automobile as defined by the NHTSA but within the tire lift zone of wheel wells and below the top of structural elements at the back of the engine compartment. As a result, the body of the automobile and its frame below the windshield will reduce the likelihood of intrusion of the vehicle frame into the automobile passenger compartment.

The side underride guard includes vertical sections extending downwardly from the structural siderail of the trailer. A horizontal beam extending longitudinally of the vehicle is fixed below the vehicle structural siderail to the lower ends of the vertical sections. The horizontal beam is to have a nominal effective ground clearance of about twenty-seven inches.

In a second aspect of the present invention, a pair of side underride guards are positioned on opposite sides of the floor of the trailer in which the two side underride guards act independently of each other.

In a third aspect of the present invention, each side underride guard includes a series of stabilizers mounted along a horizontal beam to form a triangular prism shape.

In a fourth aspect of the present invention, the side underride guard includes lateral bracing extending between the structural siderails and the horizontal beam. The lateral bracing includes longitudinal braces fixed at one end to one of the structural siderails and to the horizontal beam at the lower end of the vertical sections at the other end, respectively. By having the bracing extend to the structural siderails, stress raisers in the trailer bed are mitigated upon an impact on the guard bar, which can occur if support is affixed to the trailer bed. Such stress raisers would compromise the flexibility of the vehicle bed to adjust under cargo loads.

Accordingly, it is an object of the present invention to provide an improved side underride guard. Other and further objects and advantages will appear hereafter.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention. In addition, directional terminology is not intended to be limiting, but rather used for ease, efficiency, and clarity. As such, directional terms such as top, bottom, upper, lower, vertical, horizontal, diagonal, and the like, are used in reference to the present invention being properly installed on a trailer and viewing the trailer along its longitudinal centerline.

Figure 1:
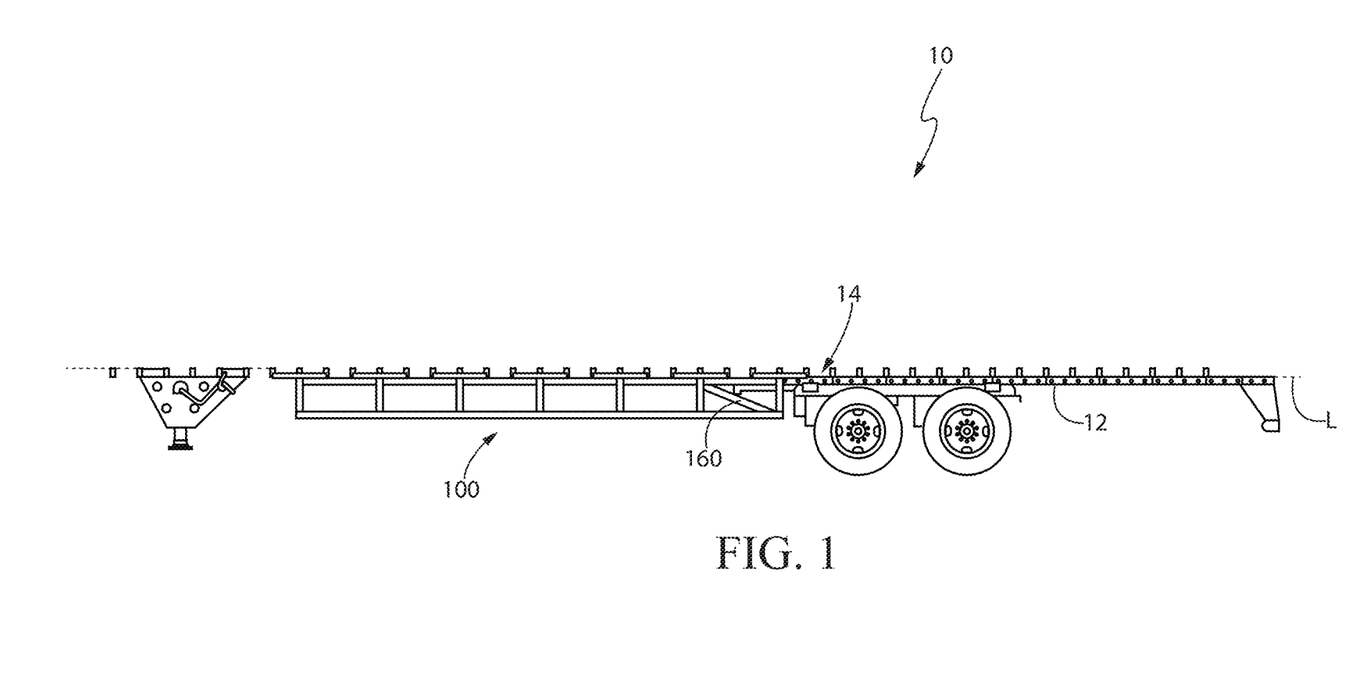
FIG. 1 shows a side elevation view of a trailer with an embodiment of the side underride guard installed.
Figure 6:
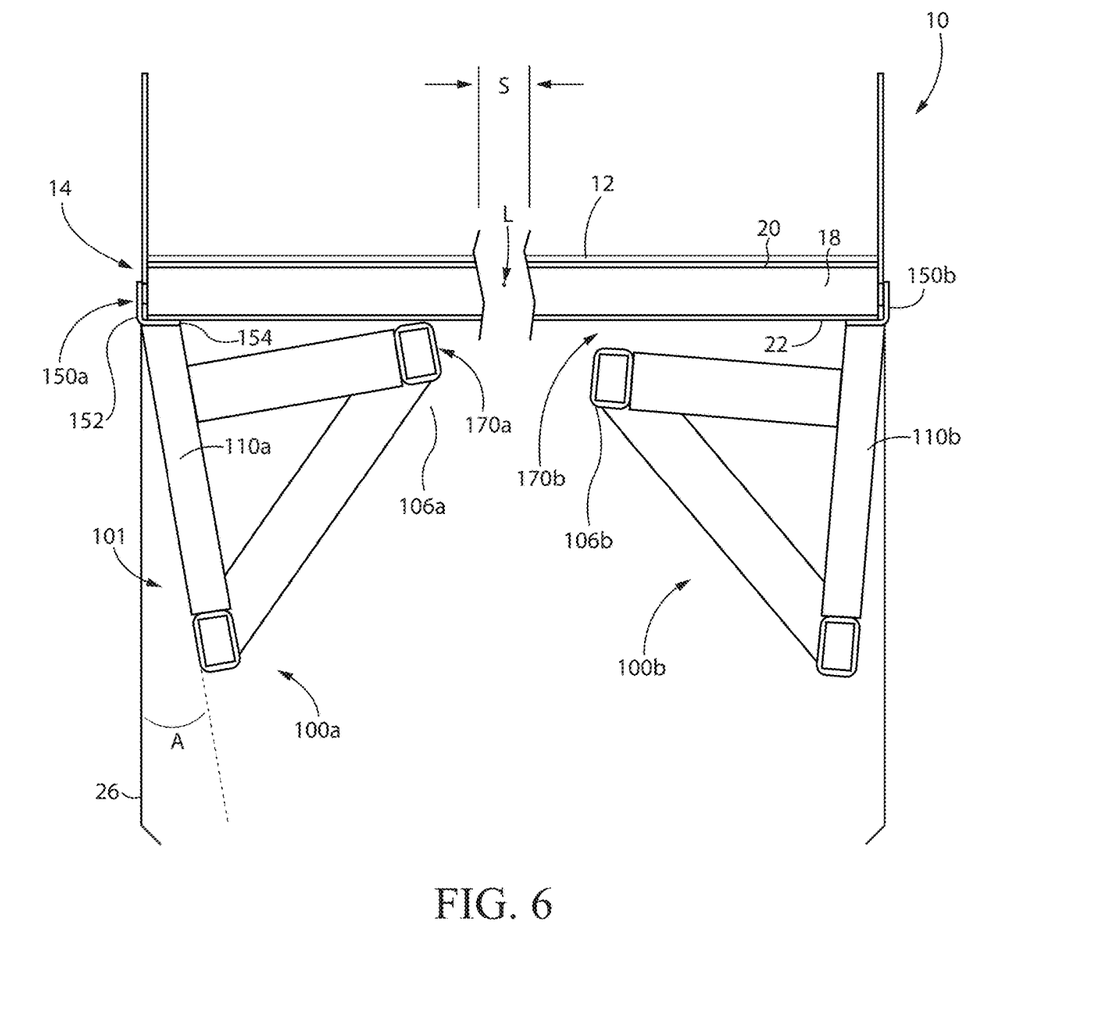
FIG. 6 shows a rear view of the present invention in its natural state before any lateral impact.

With references to the figures, a trailer 10 for tractor-trailer rigs is illustrated in FIG. 1. This trailer 10 may be a vehicle with trucks at each end or only at the rear end in the form of a semi-trailer, either being associated with a tractor-trailer rig. Both such vehicle configurations are here referred to as a trailer. Such trailers are high and heavy and automobiles can underride the trailer in a collision. The trailers 10 generally comprise a trailer bed that defines the floor 12 of the trailer 10. The floor 12 is generally flat and rectangular in shape defining a longitudinal centerline L approximately central to the opposing long sides of the floor 12 and along the length of the trailer. In general, the floor 12 of the trailer 10 is supported by floor-support crossmembers 16 that span the width of the floor 12. A plurality of floor-support crossmembers 16 can be positioned intermittently spaced apart along the length of the floor 12. The floor-support crossmembers 16 can be in the form of an I-beam having a web 18 terminating at opposite flanges, referred to herein as a top flange 20 and a bottom flange 22 based on proper installation. Properly installed, the top flange 20 is in direct contact with the floor 12 as shown in FIG. 6.

The trailer 10 has a side impact guard, in the form of a side underride guard 100 that runs parallel to the longitudinal centerline L of the trailer 10 to prevent automobiles from riding too deep under the floor 12 of the trailer 12 during a side collision. The side underride guards 100 are attached to structural siderails 14 on the outboard side of the the floor 12. As such, the side underride guards 100 have an outboard side 101 configured to attach to the siderails 14 at the sides of the floor 12, and an inboard side 103 directed towards the longitudinal centerline L of the floor 12. In the preferred embodiment, the side underride guards 100 do not attach to the floor-support crossmembers 16 of the trailer 10. In addition, when installed, the side underride guard 100 should not pass the longitudinal centerline L. The side underride guard 100 reduces the likelihood of an automobile driven into the side of the trailer 10 continuing thereunder such that the passenger area of the automobile reaches the structural siderails 14 of the frame of the trailer 10.

Figure 2:
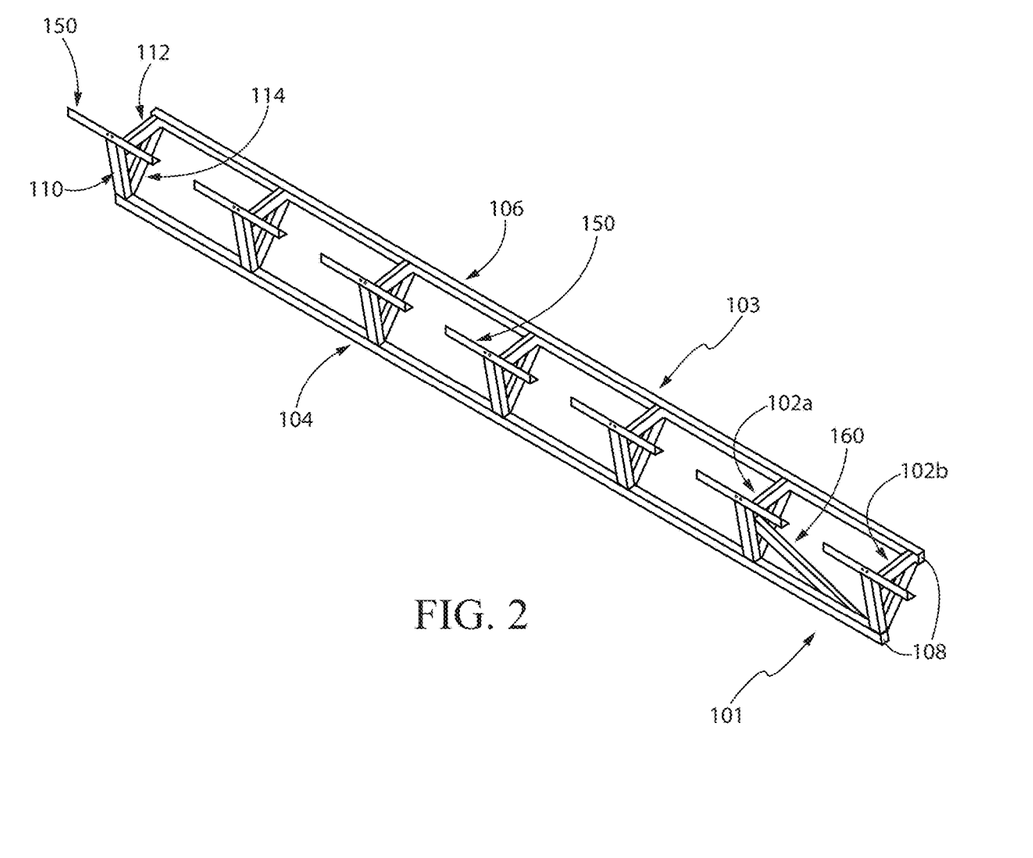
FIG. 2 shows a perspective view of an embodiment of the side underride guard.

With reference to FIG. 2, the side underride guard 100 comprises a series of repeating stabilizers 102 arranged in a series along two beams 104, 106. The beams 104, 106 can be constructed as a hollow tube, preferably, made of metal. End caps 108 can be placed at the ends of the beams 104, 106 to cover the tube. Each stabilizer 102 is generally triangular in shape as viewed from the rear, not the side, of the trailer (i.e. along the centerline L). As such, the underride guard 100 generally has an overall triangular prism shape. The triangular shape of each stabilizer 102 is defined by three sections. Based on the proper installation of the side underride guard 100 on a trailer 10 and viewed from the back to the front, the first leg is referred to as a vertical section 110, the second leg is referred to as a horizontal section 112, and the third leg is referred to as a diagonal section 114. In the preferred embodiment, the vertical section 110 and the horizontal section 112 form approximately a right angle, making the diagonal section 114 the hypotenuse. The vertical section 110, horizontal section 112, and diagonal sections 114 can be formed from metal plates, tubes, formed angles, channels, and the like. The form of these sections can depend on the material used. For example, if lighter weight aluminum is used, then the vertical section 110, horizontal section 112, and diagonal section 114 can be made of tubes. If heavier weight steel is used, then the vertical section 110, horizontal section 112, and diagonal section 114 can be formed as angles or channels to reduce weight without compromising strength. In some embodiments, a combination of tubes, channels, angles, and the like can be used to form the sections.

In some embodiments, the vertical section 110, the horizontal section 112, and the diagonal section 114 can be separate pieces that are connected together (for example, via welding or any other fastening technique) to form the triangle. In some embodiments, the vertical section 110, the horizontal section 112, and the diagonal section 114 can be integrally formed from a single piece of material. For example, the vertical section 110, the horizontal section 112, and the diagonal section 114 can be vertical, horizontal, and diagonal flanges of one single part, and formed by sheet metal pressing or casting from the same single part or flat sheet of metal.

Figure 3:
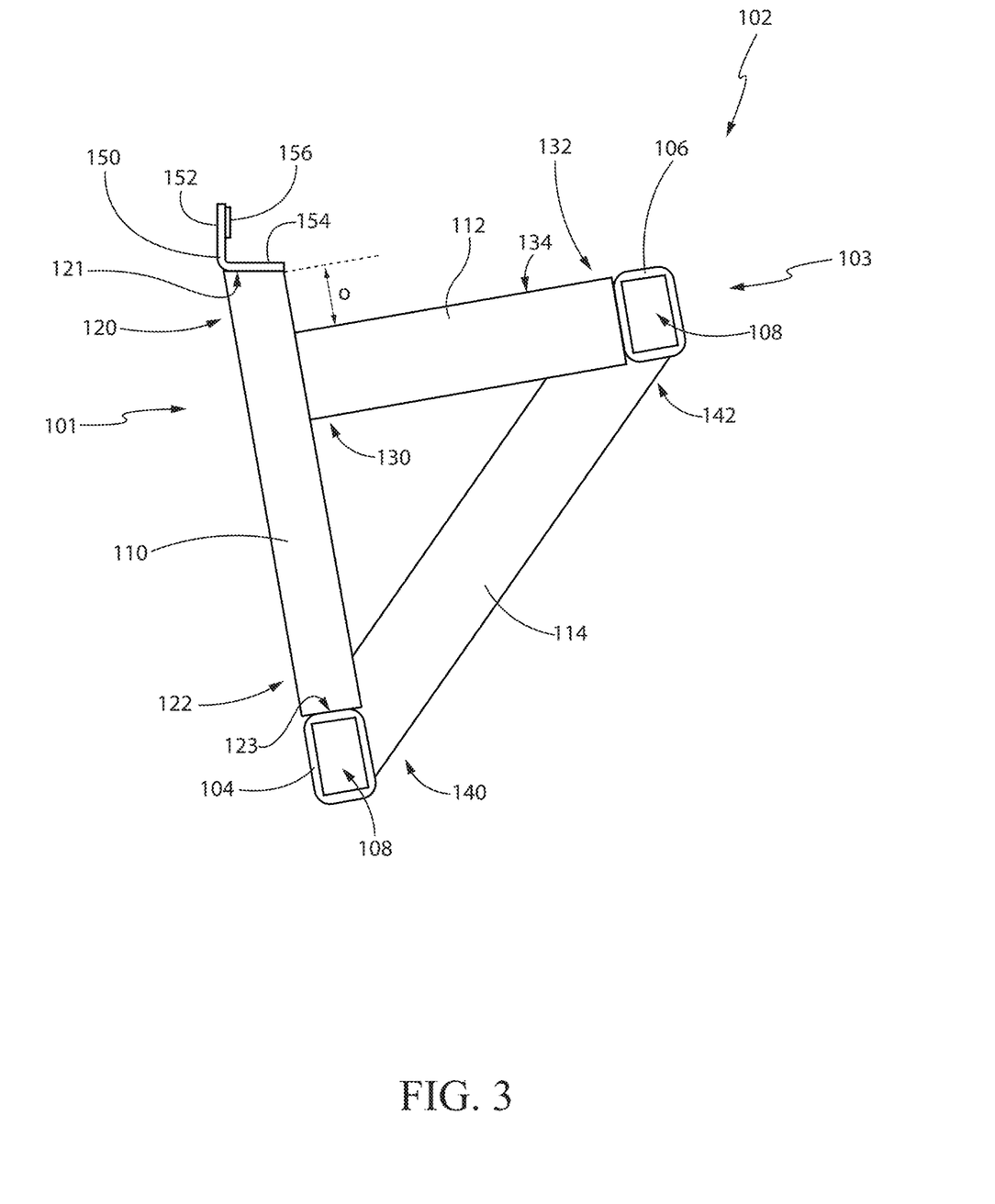
FIG. 3 shows a rear view of an embodiment of the stabilizer.
Figure 4:
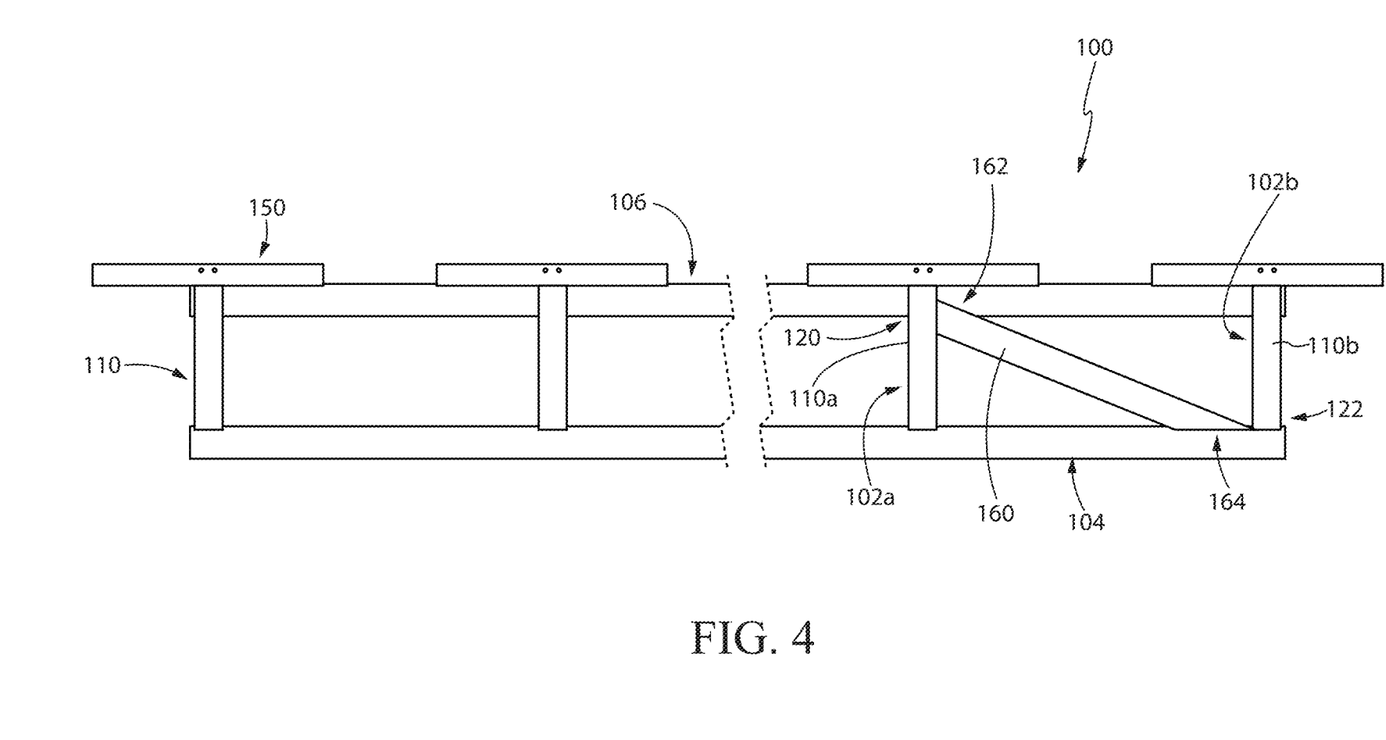
FIG. 4 shows a side elevation view from the outboard side of an embodiment of the side underride guard.

With reference to FIG. 3, the first leg or vertical section 110 comprises an upper end 120 terminating at a top surface 121, and a lower end 122 terminating a bottom surface 123 opposite the upper end 120. The second leg or horizontal section 112 comprises an outboard end 130 and an inboard end 132 opposite the outboard end 130. The third leg or diagonal section 114 comprises a lower-outboard end 140 and an upper-inboard end 142 opposite the lower-outboard end 140. In some embodiments, the outboard end 130 of the horizontal section 112 can be operatively connected to the upper end 120 of the vertical section 110, the lower-outboard end 140 of the diagonal section 114 can be operatively connected to the lower end 122 of the vertical section 110, and the inboard end 132 of the horizontal section 112 can be operatively connected to the upper-inboard end 142 of the diagonal section 114, thereby forming the triangular shape.

In the preferred embodiment, the outboard end 130 of the horizontal section 112 is offset slightly from the top surface 121 of the upper end 120 of the vertical section 110. For example, the top side 134 of the horizontal section 112 can have an offset distance O of about at least about 1 inch to about 5 inches (and preferably about 2.125 inches) below the top surface 121 of the upper end 120 of the vertical section 110.

Figure 5:
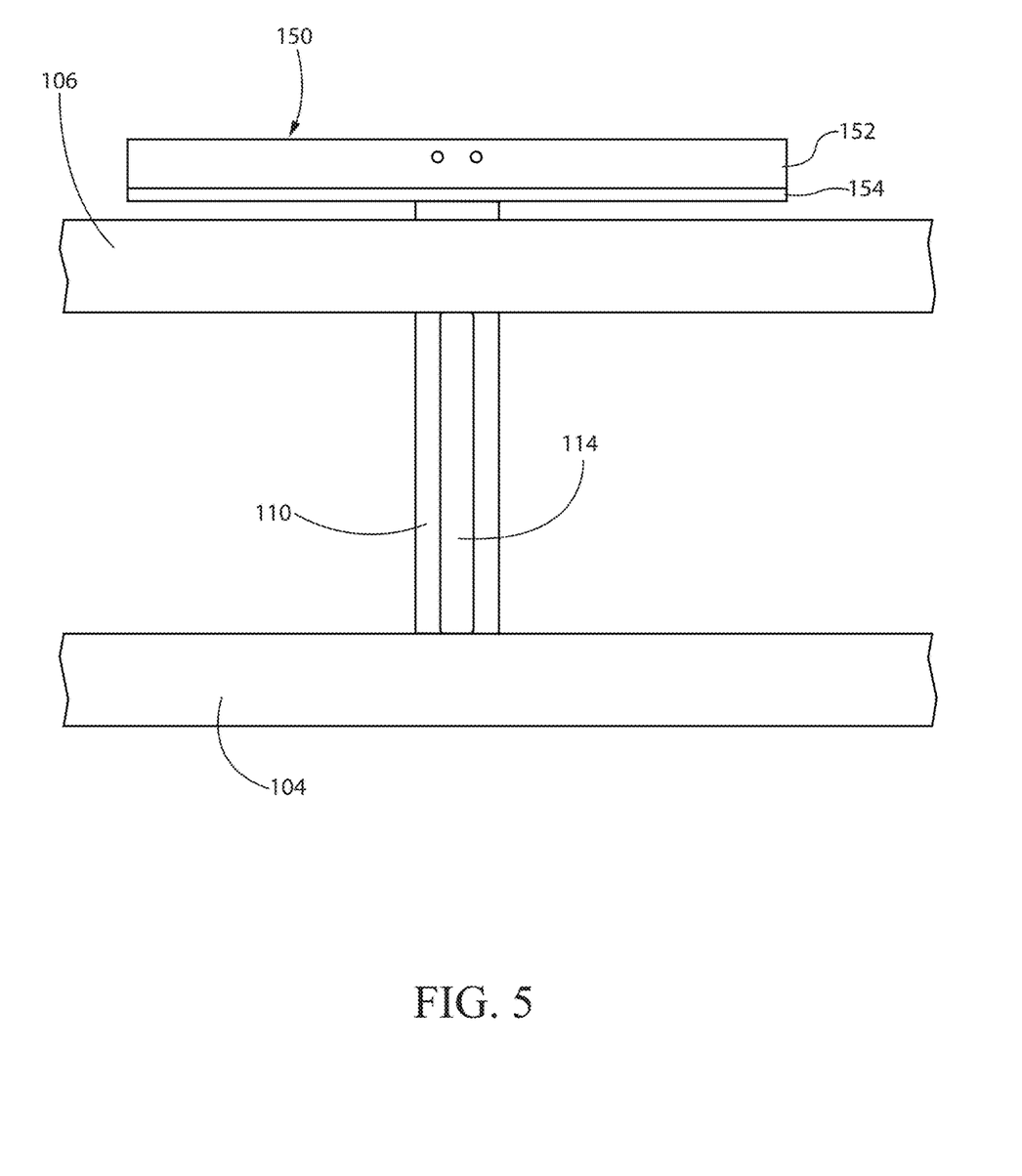
FIG. 5 shows a side elevation view from the inboard side of an embodiment of a portion of the side underride guard along a stabilizer.

With reference to FIGS. 2-5, the lower end 122 of the vertical section 110 and/or the lower-outboard end 140 of the diagonal section 114 can be operatively connected to the first beam 104 in approximately a perpendicular manner to the first beam 104 when viewed from the outboard side 101 or the inboard side 103 as shown in FIG. 5. When the underride guard 100 is properly installed on a trailer 10, the first beam 104 is positioned on the outboard side 101 of the underride guard 100 in a horizontal orientation extending parallel to the longitudinal centerline L of the floor 12. The first beam 104 extends substantially the whole length of the underride guard 100 and provides lower support for each stabilizer 102. Each stabilizer 102 can be intermittently spaced apart along the first beam 104 and the second beam 106. The stabilizers 102 are spaced apart to good effect and can be welded at their upper ends 120 to mounting brackets 150, which are in turn bolted to the structural siderails 14 at the trailer floor-support crossmembers 16. Preferably, the top surface 121 of the vertical section 110 is connected to the mounting bracket 150. A spacer 156 can be placed between the mounting bracket 150 and the siderail 14 of the trailer 10.

Similarly, the inboard end 132 of the horizontal section 112 and/or the upper-inboard end 142 of the diagonal section 114 can be operatively connected to the second beam 106. When the underride guard 100 is properly installed, the second beam 106 is positioned on the inboard side 103 of the underride guard 100 in a horizontal orientation generally parallel to the longitudinal centerline L of the floor 12. The second beam 106 extends substantially the whole length of the underride guard 100 and provides upper support for each stabilizer 102. Each stabilizer 102 can be intermittently spaced apart along the second beam 106. As discussed further below, the second beam 106 also buttresses against the floor-support crossmembers 16 of the trailer 10 when the underride guard 100 is impacted laterally from the outboard side 101.

Mounting brackets 150 can be positioned at the upper end 120 of the vertical section 110 to fasten the stabilizer 102 to the trailer 10. In the preferred embodiment, the mounting bracket 150 is an angled mounting bracket. The preferred mounting bracket 150 is formed by elongated flanges 152, 154 forming approximately a 90 degree angle. In other words, the first elongated flange 152 and second elongated flange 154 can have flat surfaces that are perpendicular to each other. The mounting bracket 150 can then be connected to a corner of the floor 12 at the structural siderails 14. For example the first elongated flange 152 can connect to the side of the structural siderail 14 and the second elongated flange 154 can connect to the bottom of the floor 12 or the floor-support crossmember 16. As such, the second elongated flange 152 can be connected to the top surface 121 of the vertical section 110. Preferably, each stabilizer 102 is operatively connected to one mounting bracket 150.

In this configuration, the underride guard 100 is attached to the trailer 10 along a single line of attachment along the lateral side of the trailer 10. Furthermore, there is no physical connection of the side underride guard 100 to inboard portions of the trailer 10. This configuration allows the side underride guard 100 to swing medially and upwardly towards the longitudinal centerline L of the trailer 10.

For further stabilization, a cross brace or longitudinal brace 160 is operatively connected to the first beam 104 in between two stabilizers 102a, 102b to resist in-plane shear forces on the underride guard 100. As such, the longitudinal brace 160 is configured to extend in the direction of the longitudinal centerline L of the trailer 10 when the side underride guard 100 is properly installed on the trailer 10. Preferably, the longitudinal brace 160 comprises a first end 162 and a second end 164 opposite the first end 162. The first end 162 of the longitudinal brace 160 can be operatively connected to the upper end 120 of a first vertical section 110a of a first stabilizer 102a or to the floor 12, siderail 14, or floor-support crossmember 16, and the second end 164 can be operatively connected to the first beam 104 adjacent to the lower end 122 of a second vertical section 110b of a second stabilizer 102b. In some embodiments, one longitudinal brace 160 can be in between each pair of stabilizers 102. In some embodiments, only one longitudinal brace 160 may be required, for example, in between the last two rear stabilizers 102a, 102b. In some embodiments, two longitudinal braces 160 can be used in between a pair of stabilizers forming an X-configuration when viewed from the side. The longitudinal brace 160 resists any longitudinal forces that could cause the underride guard 100 to "matchbox" and collapse in the longitudinal direction. In addition, the beams 104, 106 offer torsional stiffness, which can distribute impact loads to adjacent longitudinal braces 160 of the underride guard 100.

With reference to FIG. 6, in the preferred embodiment a pair of underride guards 100a, 100b are operatively connected to a trailer 10 on opposite lateral sides of the trailer 10. As such, the second underride guard 100b can be essentially a mirror image of the first underride guard 100a with the same features described above. The underride guards 100a, 100b are attached to the trailer 10 via the mounting brackets 150 so that the underride guards 100a, 100b hang below the floor 12. In the preferred embodiment, the first underride guard 100a and the second underride guard 100b can function independently of the other. In other words, the first underride guard 100a and the second underride guard 100b are not directly connected to each other by any kind of crossmember. In some embodiments, the two underride guards 100a, 100b can be connected to each other.

In the preferred embodiment, the vertical sections 110a, 110b of each underride guard 100a, 100b have an angle of inward displacement A in which the vertical sections 110a, 110b are angled medially towards the longitudinal centerline L of the floor 12. As such, the vertical sections 110a, 110b of the stabilizers on the first underride guard 100a are non-parallel to the vertical sections 110b of the corresponding stabilizer on the second underride guard 100b on the opposite lateral side of the trailer 10 because they bend toward each other. As such, the side underride guards 100a, 100b are canted inwardly towards each other.

In other words, referring to one side (here, left side of FIGS. 6 and 7), an imaginary vertical line B extends perpendicularly from the side of the floor 12 to the ground from the lateral side of the floor 12 adjacent to the outboard side 101 of the side underride guard 100a. In trailers 10 with a side skirt 26, the imaginary line B can be within the plane of the side skirt 26. The imaginary line B can extend parallel to the flat surface of the first elongated flange 152 on the outboard side of the vertical section 110a and form an angle of inward displacement A of about 5 degrees to about 35 degrees with the vertical section 110a. In some embodiments, the angle of inward displacement A can be about 10 degrees to about 30 degrees. In some embodiments, the angle of inward displacement A can be about 15 degrees to about 25 degrees. Therefore, the vertical section 110 is non-parallel to the flat surface of the first elongated flange 152, the siderail 14 of the trailer 10 to which the first elongated flange 152 is attached, or the side skirt 26. This configuration can be adopted on the opposite side with the second underride guard 100b but with the angle of displacement in the opposite direction so that the vertical sections 110a, 110b angle towards each other.

Having the underride guards 100a, 100b angled inwardly (or medially toward the longitudinal centerline L) enables vertical trailer aerodynamic side skirts 26, attached near the siderail 26, to flex inboard when making contact with the ground and thus reduce damage. In addition, with the side underride guards 100a, 100b canted inwardly, the attached aerodynamic side skirt 26 needs to flex less to achieve the same horizontal orientation, and is less likely to flex outward, thereby lessening the damage to the side skirt 26. The inward cant of the underride guards 100a, 100b and the greater ground clearance (compared to prior art designs) minimize high-centering conditions that plague other models and minimize damage to aerodynamic devices that are attached to the guard by allowing it to flex inwardly more easily.

Figure 8:
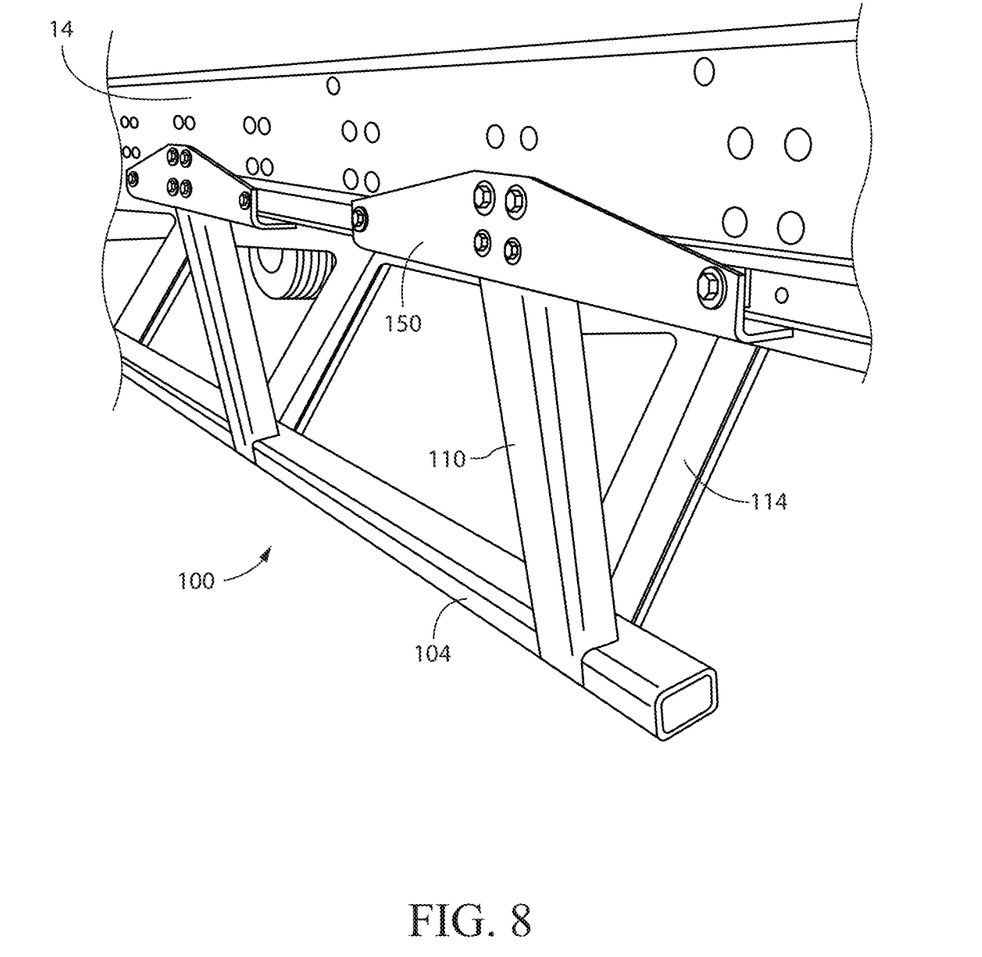
FIG. 8 shows a perspective view of a portion of the side underride guard installed on a trailer.

The inward cant and movement of the underride guards 100a, 100b can be achieved because the underride guards 100a, 100b do not attach to the floor-support crossmembers 16 of the trailer 10 on the inboard side. Rather, the underride guards 100a, 100b are only attached to the floor 12 at the lateral sides as shown in FIG. 8. The underride guards 100a, 100b hang sufficiently below the floor 12 and floor-support crossmembers 16 of the trailer 10 such that even with the inward angle of the vertical sections 110a, 110b, the second horizontal beams 106a, 106b maintain a gap 170a, 170b from the bottom flange 22 of the floor-support crossmembers 16, even when the trailer 10 experiences deflection or bowing due to floor loads. Prior art guards that are attached to the floor-support crossmembers 16 can break when the trailer 10 is loaded due to the rigidity of the connection to the floor-support crossmember 16, which can deflect or bow with the application of the load. Because the underride guards 100a, 100b are not connected to and are spaced apart from the floor-support crossmembers 16 of the trailer 10, the floor 12 and floor-support crossmembers can deflect and bow independent of the underride guards 100a, 100b, and maintain the gap 170a, 170b.

In general, the gap 170a, 170b between the second horizontal beam 106 and the bottom flange 22 of the floor-support crossmember 16 can be about 0.5 inch to about 5 inches when the trailer 10 is unloaded. Preferably, the gap 170a, 170b can be about 0.75 inch to about 4 inches when the trailer 10 is unloaded. More preferably, the gap 170a, 170b can be about 1 inch to about 3 inches when the trailer is unloaded. For example, the gap 170a, 170b can be about 1.25 inch to about 2 inches when the trailer 10 is unloaded. In another example, the gap 170a, 170b can be about 0.75 inch to about 1.25 inch when the trailer 10 is unloaded. These gap 170a, 170b sizes can keep clearance between the second horizontal beam 106 and the bottom flange 22 of the floor-support crossmember 16 whether the trailer 10 is loaded or unloaded.

Figure 7:
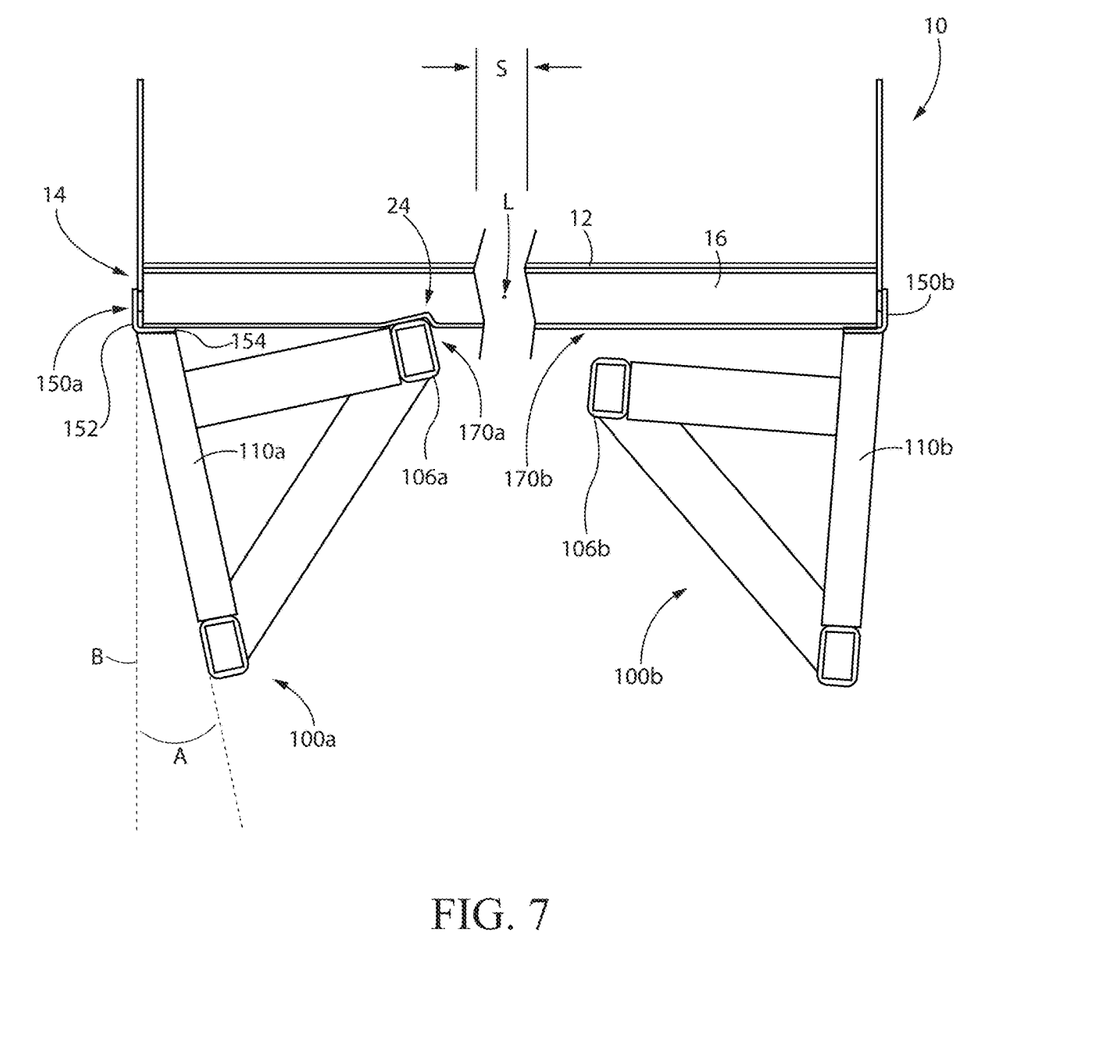
FIG. 7 shows a rear view of the present invention showing the effects of lateral impact.

Because the side underride guard 100 hangs from the upper ends 120 of the vertical sections 110 of each stabilizer 102 only at the outboard side 101, the side underride guard 100 is able to move medially toward the longitudinal centerline L of the trailer 10 (or in the inboard direction). When a lateral (impact) load is applied toward the trailer 10 on the side in which the side underride guard 100a is mounted (for example, the left side in FIG. 6), the side underride guard 100 will initially rotate about its mounting bracket 150a. This lateral load is the first reaction load originating from the mounting bracket 150 connection to the siderail 14 of the trailer 10. As shown in FIGS. 6-7, the first beam 106a is deflected inward causing the second beam to deflect upward and contact the bottom flange 22 of at least one of the floor-support crossmembers 16. As such, this rotation mechanism allows for the closing of the gap 170a between one or more floor-support crossmembers 16 of the trailer floor 12 and the second horizontal beam 106a, but only on the side of the impact. As the force of the impact pushes the second horizontal beam 106a into the bottom flanges 22 of the floor-support crossmember 16 of the trailer 10, the vertical reaction load from the floor-support crossmembers 16 to the second horizontal beam 106a causes the bottom flanges 22 of the floor-support crossmembers 16 to locally deflect upward causing the underride guard 100 to deform the floor-support crossmember 16, thereby forming a saddle 24 (see, FIG. 7). The bottom flange 22 initially deflects elastically and subsequently deforms plastically around the second beam in a concave downward manner to form the saddle 24 around the second beam, thereby preventing lateral sliding of the second beam along the bottom flange beyond frictional resistance, resulting in additional lateral support to the side underride guard 100a that was not present prior to the contact of the second beam with the bottom flange 22. Therefore, this contact of the second beam 106 against the bottom flange 22 of the floor-support crossmember 16 provides the second reaction load to the force that pushed the first beam inboard (first reaction load). This saddle 24, and the strength of the floor-support crossmember 16, prevent relative movement and restrict further rotation of the underride guard 100a, limiting additional travel under the trailer 10 resulting in one or more vertical down load reactions applied to the side underride guard 100a. This deflection creates a depression that enables a new lateral reaction load opposite to the applied lateral load.

Figure 9:
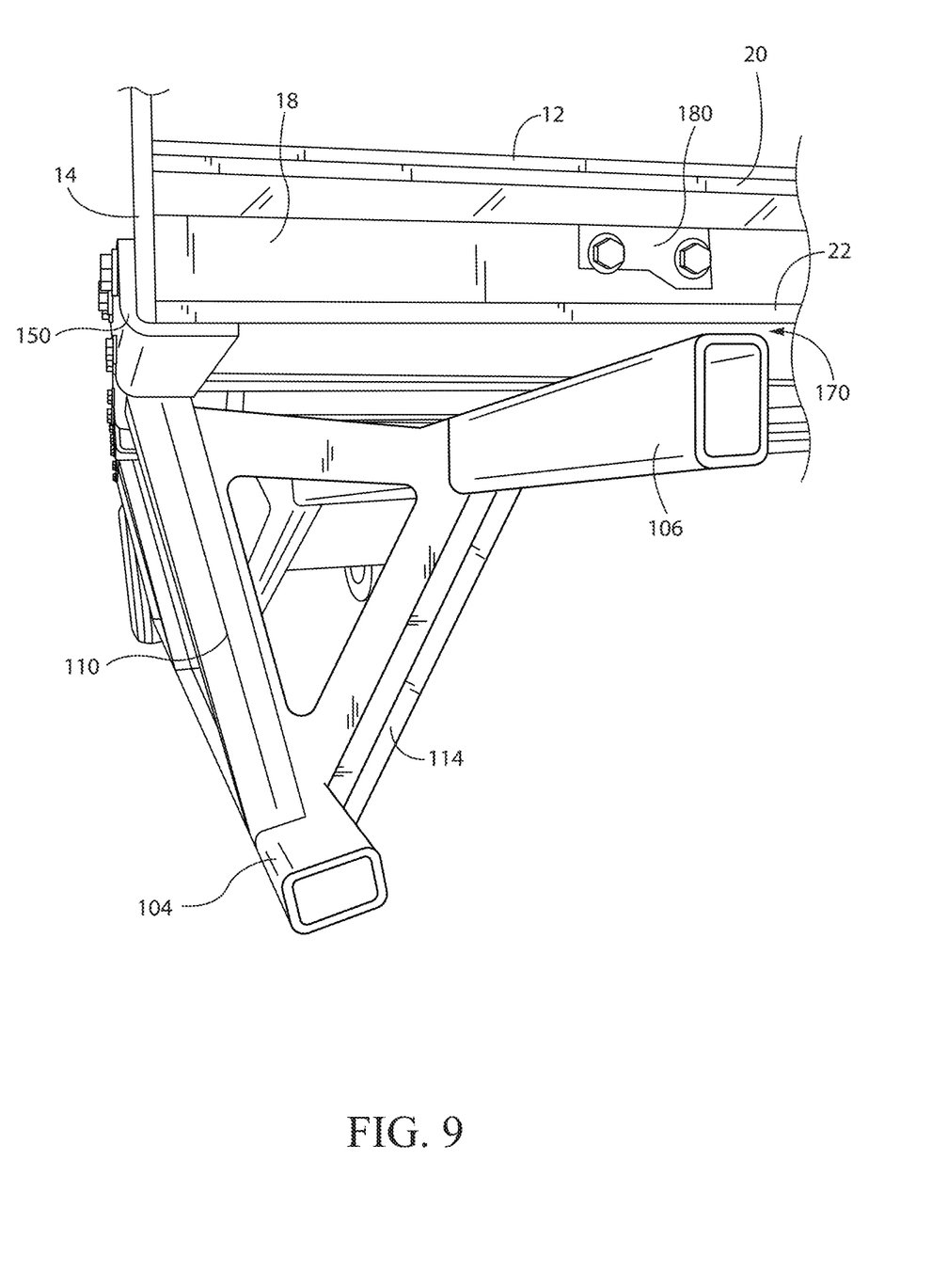
FIG. 9 shows a perspective view of a portion of the side underride guard installed on a trailer as viewed longitudinally down the centerline of the trailer.
Figure 10:
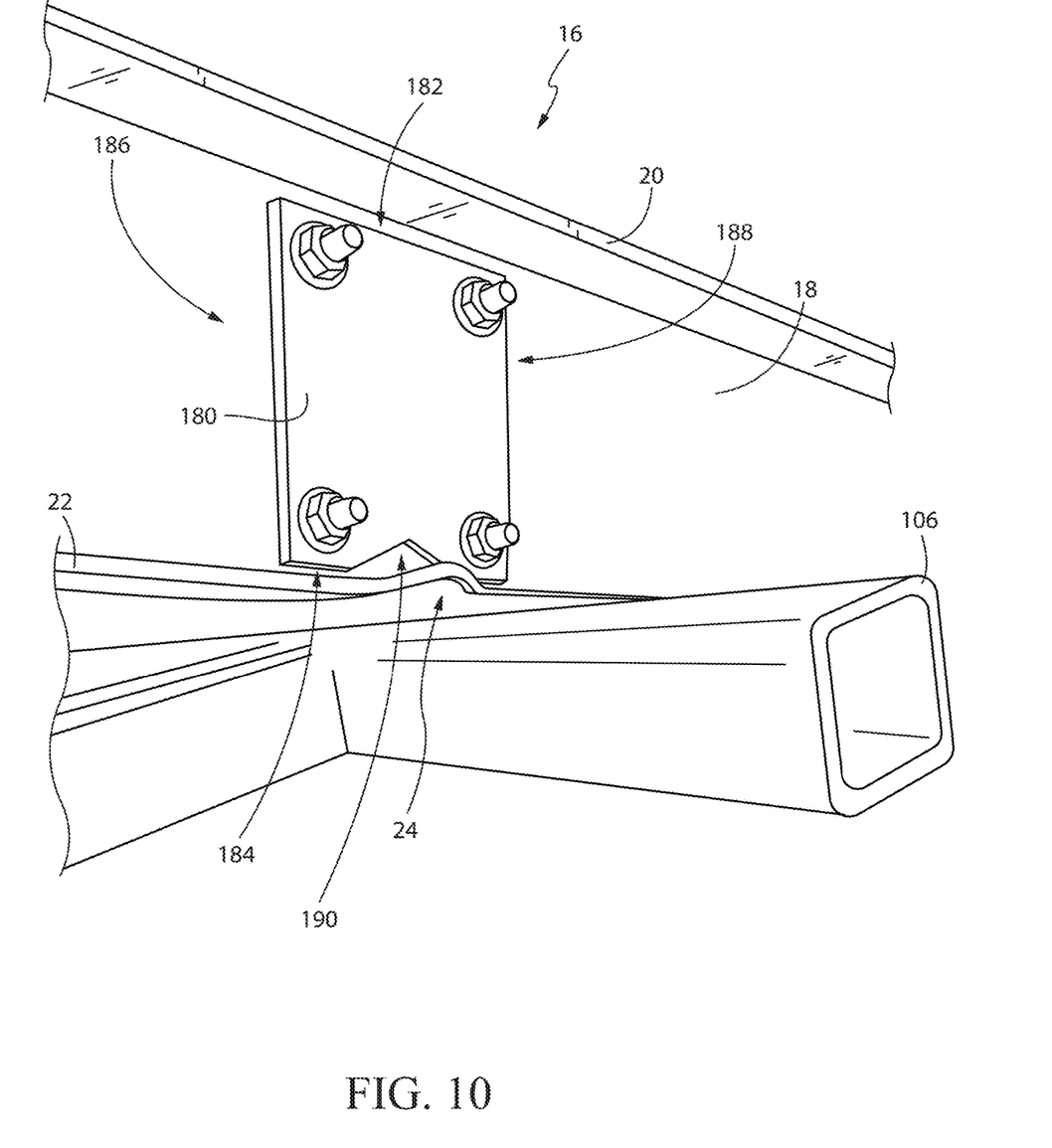
FIG. 10 shows a partial view of the side underride guard after lateral impact causes the side underride guard to form a saddle in the floor-support crossmember.

In other words, as the second reaction load increases in magnitude in mostly a vertical direction, the bottom flanges 22 of the floor-support crossmembers 16 will deform upward (approximately) and form a saddle 24 around the contact area of the second beam 106 as shown in FIG. 7. The deformation of the bottom flanges 22 will progress until it provides a horizontal outboard reaction load in addition to the initial vertical reaction to supplement the bracket attachment and enables the impact vehicle to lift the loaded trailer. In some embodiments, the second reaction load may compromise the web 18 of the floor-support crossmembers 16. To minimize damage or yielding of the web 18 to the second reaction load, a reinforcing plate 180 can be installed on the web 18 of the floor-support crossmember 16 as shown in FIGS. 9-10.

Figures 11A, 11B, 11C:
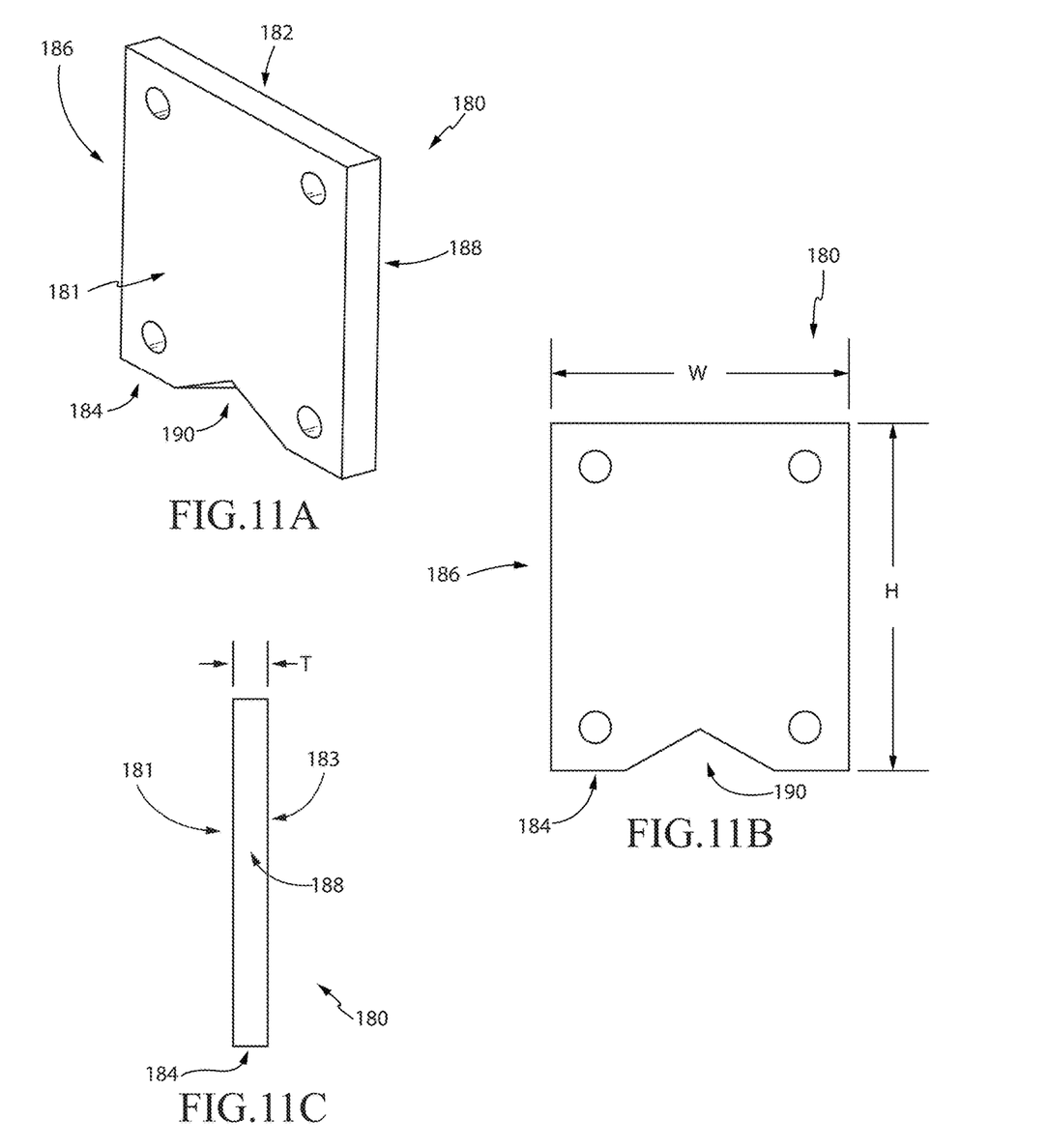
FIGS. 11A-11C show perspective, front, and side views of the reinforcing plate, respectively.

With reference to FIGS. 11A-11C, the reinforcing plate 180 can be a flat plate. In the preferred embodiment, the reinforcing plate 180 is generally rectangular in shape. However, other shapes can be used as well, such as circular, oval, triangular, and any other polygonal shape. In general, the reinforcing plate 180 can be described as having a first surface 181 and a second surface 183 opposite the first surface 181, the first and second surfaces 181, 183 being bound by a top side 182, a bottom side 184 opposite the top side 182, and two opposing lateral sides 186, 188 adjacent to the top side 182 and the bottom side 184. The defining feature of the reinforcing plate 180 is a notch 190 created on the bottom side 184. In the preferred embodiment, the notch 190 is in the form of an inverted "V" shape, although other shapes can be used, such as an inverted "U", "Z" shape, "S" shape, and the like. Essentially, the notch 190 creates a relief along the bottom side 184 of the reinforcing plate 180.

The height H of the reinforcing plate 180 (distance from the top side 182 to the bottom side 184) must be sufficient to fit within the top flange 20 and bottom flange 22 of the floor-support crossmember 16. Preferably, the reinforcing plate 180 generally occupies approximately 90 percent to approximately 100 percent of the height of the web 18 (distance between the top flange 20 and the bottom flange 22) except for the notch 190. In some embodiments, the reinforcing plate 180 can occupy approximately 80 percent or more of the height of the web 18. In some embodiments, the reinforcing plate 180 can occupy approximately 70 percent or more of the height of the web 18. In some embodiments, the reinforcing plate 180 can occupy approximately 60 percent or more of the height of the web 18. In some embodiments, the reinforcing plate 180 can occupy approximately 50 percent or more of the height of the web 18.

The thickness T (distance from first surface 181 to the second surface 183) of the reinforcing plate 180 can range from about 0.1 inch to about 1 inch. Preferably, the thickness T can range from about 0.20 inch to about 0.8 inch. More preferably, the thickness T can be about 0.25 inch to about 0.75 inch. For example, the thickness T can be about 0.4 inch to about 0.6 inch. Depending on the thickness T of the reinforcing plate 180 a single reinforcing plate 180 can be used on one side of the web 18. In some embodiments, two reinforcing plates 180 can be used on opposite sides of the web 18. If two reinforcing plates 180 are used on opposite sides of the web 18, the notches 190 of both reinforcing plates 180 should be aligned.

The width W (distance between lateral sides 186, 188) of the reinforcing plate 180 can vary, but is preferably less than 10 inches. More preferably the width W of the reinforcing plate is less than about 8 inches. For example, the width W can be about 3 inches to about 5 inches.

The area of relief created by the notch 190 can be about 1 percent to about 40 percent of the surface area of the reinforcing plate 190. Preferably, the area of relief created by the notch 190 is about 5 percent to about 30 percent of the surface area of the reinforcing plate 190. More preferably, the area of relief created by the notch 190 is about 10 percent to about 20 percent of the surface area of the reinforcing plate 190.

The reinforcing plate 180 can be installed on the web 18 of the floor-support crossmember 16 such that when a lateral load is applied sufficiently on the outboard side 101 of the underride guard 100 causing the second horizontal beam 106 to contact the bottom flange 22 of the floor-support crossmember 16, the notch 190 is aligned with or corresponds with the contact point of the horizontal beam 106 and the bottom flange 22 as shown in FIG. 10. In other words, the reinforcing plate 180 is positioned such that the notch 190 aligns with or corresponds with the anticipated location of the saddle 24. This configuration of the reinforcing plate 180 on the web 18 of the floor-support crossbeam 16 allows the bottom flange 22 to deform while maintaining the integrity of the web 18.

In general, the underride guard 100 configuration ensures that the braces, i.e., the vertical section 110, horizontal section 112, and diagonal section 114 are sufficiently short in length, and form a triangle shape, to prevent buckling under load. For example, at its longest point, the vertical section 110 can have a length of about 20 inches or less given its cross-sectional geometric properties. Preferably, the length of the vertical section 110 can be about 17 inches or less. More preferably, the length of the vertical section can be about 15 inches or less. In one example, the vertical section 110 has a length of about 15.375 inches. The horizontal section 112 can have a length of about 15 inches or less. Preferably, the horizontal section 112 can have a length of about 12 inches or less. More preferably, the horizontal section 112 can have a length of about 10 inches or less. In one example, the horizontal section 112 has a length of about 10.875 inches. The diagonal section 114 can have a length of about 23 inches or less. Preferably, the horizontal section 114 can have a length of about 20 inches or less. More preferably, the diagonal section 114 can have a length of about 17 inches or less. In one example, the diagonal section has a length of about 17.5 inches. If or when the side underride guard 100 detaches from the mounting bracket 150 or the trailer 10, these short sections 110, 112, 114 will allow the triangular stabilizer 102 to roll while the three sections 110, 112, 114 remain attached to the first and second horizontal beams 104, 106.

Because the side underride guards 100a, 100b on the two opposing sides of the trailer 10 are two separate pieces, a substantial space S in the middle of the trailer 10 is created. The space S between two opposing underride guards 100a, 100b is designed to clear any trailer suspension, articulating brake hoses, and the like. This space S, created by having two separate underride guards 100a, 100b also reduces the overall weight of the underride guard 100 compared to prior art underride guards such as that disclosed in U.S. Pat. No. 11,691,583 by approximately 180 pounds. Having detached and lighter underride guards 100a, 100b simplifies installation by reducing the need for careful alignment of the two sides of the guards 100a, 100b to make sure they align with each other.

Detached and independent underride guards 100a, 100b also allow for installation variations on the two different sides. In other words, installation of the two underride guards 100a, 100b need not be mirror image installations. For example, it is possible to have an underride guard 100a on the left-hand side (driver side or road side) of the trailer 10 that is mounted at its forward location immediately in back of a refrigeration-unit fuel tank, while the underride guard 100b on the right-hand side (passenger side or curb side) of the trailer 10 is mounted immediately behind the landing legs. This design allows better access to the fuel tank and is not possible with the design that involves cross pieces that tie the two sides of the guards together.

Additionally, this space S in between the two side underride guards 100a, 100b allows for other optional trailer devices and working equipment, such as tire carriers, belly boxes, lift ramps, toolboxes, auxiliary batteries, and the like to be attached to the trailer 10 without any hindrance. Another benefit to the significant space S between the two opposing underride guards 100a, 100b is that less snow and ice can collect, form, and add significant weight to the trailer in cold environments.

The components described herein can be operatively connected together in a structurally sound manner, for example, by welding, with nuts and bolts, and the like. All measurements are provided as approximations to account for manufacturing tolerances.

In use, a side protection system can be configured on a trailer 10 by providing a first side underride guard 100a, comprising a first beam 104, a second beam 106 parallel to the first beam 104, and a series of repeating stabilizers 102 mounted on the first beam 104 and the second beam 106. Each stabilizer 102 is intermittently spaced apart along the first beam 104 and the second beam 106. Each stabilizer 102 in the series of repeating stabilizers comprises three sections forming a triangular shape, wherein the three sections comprise a first (vertical) section 110, a second (horizontal) section 112 having an outboard end 130 and an inboard end 132, the outboard end 130 connected to the first section 110, and a third (diagonal) section 114 connected to the first section 110 and the second section 112, wherein the first beam 104 is adjacent to where the first section 110 connects to the third section 114, and the second beam 106 is adjacent to where the second section 112 connects to the third section 114. A top side 134 of the second section 112 at the outboard end 130 is offset from a top surface 121 of the first section 110.

The first side underride guard 100a can be connected to a first side of the trailer 10, the trailer 10 having a longitudinal centerline L such that the first side underride guard 100a is configured to move medially toward the longitudinal centerline L of the trailer 10. Preferably, each first section 110 is non-parallel to a siderail 14 of the trailer 10, thereby forming an angle of inward displacement A towards the longitudinal centerline L. Preferably, the first side underride guard 100a can be connected to the trailer 10 with a plurality of mounting brackets 150, wherein one mounting bracket 150 is operatively connected to each stabilizer 102. Specifically, a first flange 152 can be connected to the siderail 14 of the trailer, and the second flange 154 can be connected to the first section 110.

In this configuration, the first beam 104 is positioned on an outboard side 101 of the trailer 10 and extends longitudinally parallel to the longitudinal centerline L of the trailer 10, and the second beam 106 is position on an inboard side 103 relative to the first beam 104 and extends longitudinally parallel to the longitudinal centerline L of the trailer 10. The second beam 106 is configured to abut against the floor 12 or the floor-support crossmember 16 of the trailer 10 when the first underride side guard 100a moves medially toward the longitudinal centerline L of the trailer 10, for example, when impacted by an automobile.

A second side underride guard 100b can be connected to a second side of the trailer 10 opposite the first side, the second side underride guard 100b being configured to move medially toward the longitudinal centerline L of the trailer 10 independent of the first side underride guard 100a. As such, the second side underride guard 100b can be a mirror image of the first underride guard 100a; however, because the two are not connected to each other, impact on one does not necessarily have an impact on the other.

No standard for side guard bars has been established by NHTSA regulation, understanding that the NHTSA regulations for rear underride guards are intended for the underride bar to meet an Insurance Institute for Highway Safety (IIHS) standard that is low enough to engage the structural front end of a vehicle. Side underride guards that meet the current ground clearance standards for rear underride guards repeatedly face the problem of high centering of the trailer 10 on such a side guard bar, causing damage to the side guard bar, particularly when the trailer 10 traverses changes in grade, such as those encountered on steep driveways, loading docks, railroad tracks, and the like. However, confirmed by testing, the side underride guard 100 of the present invention, installed on the side of a trailer 10 at a nominal effective ground clearance of about twenty-seven inches has been found to arrest an IIHS standard test automobile by engaging first the sheet metal and then the structure of the automobile below the windshield even though the structural front end of the vehicle is not engaged. Thus, the present invention is believed to be the first side underride guard 100 to demonstrably protect against passenger-compartment intrusion in a side impact while avoiding damage to the trailer 10 and side underride guard 100 associated with high centering impacts that are expected in normal operation of the trailer 10.

To achieve this effective ground clearance, the lowest point of the first horizontal beams 104 can be located about 16 to 19 inches below the structural siderails 14 of a typical trailer 10 at least at their highest point where high centering is most problematic. More preferably, the first horizontal beams 104 are to be located about 17 to 18 inches below the structural siderails 14. Effective ground clearance is to be understood in this context as measured between the bottom of the first horizontal beam 104 and a level ground surface with the trailer loaded and the suspension in the most rearward position. Variations in tire pressure, tread depth, trailer weight, load, and the like affecting trailer ground clearance are understood to be within the effective range of the nominal twenty-seven inches of effective ground clearance. In some embodiments, the first horizontal beam 104 does not need to extend fully to the wheels and tires of a trailer or tractor-trailer rig as those components are virtually impenetrable to vehicle underride. Further, the wheel assembly often is designed to slide fore and aft to accommodate various configurations, weight distributions, and highway regulations.

The side underride guards 100 are principally designed to mitigate compartment intrusion of an automobile that impacts the trailer in the space between the wheels and the drop legs. For example, the configurations described herein are designed to allow the hood of the automobile to go under the underride guard 100, but stop before the A-pillar of the automobile, thereby preventing the passenger compartment from going under the underride guard 100. The ground clearance of the first horizontal beams 104 may also be reduced toward the wheels and tires of some vehicles as the likelihood of high centering may diminish. However, the lower the first horizontal beam 104, the more interference with trailer side skirt 26 flexure will be encountered.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A side impact guard for a trailer, the side impact guard comprising a first side underride guard for mounting to a first side of the trailer, the first underride guard comprising:
   a) a pair of beams comprising a first beam and a second beam parallel to the first beam;
   b) a series of repeating stabilizers mounted on the pair of beams, wherein each stabilizer is intermittently spaced apart along the first beam and the second beam;
   c) a longitudinal brace operatively connected to the first beam in between two stabilizers to resist in-plane shear forces on the first side underride guard longitudinal to a length of the trailer;
   d) a plurality of mounting brackets operatively connected to each stabilizer, each mounting bracket configured to connect to a structural side rail of the trailer, wherein each mounting bracket comprises a first elongated flange having a flat surface and a second elongated flange having a flat surface that is perpendicular to the flat surface of the first elongated flange;
   e) wherein each stabilizer in the series of repeating stabilizers is triangular in shape, each stabilizer comprising three sections, wherein when installed on the trailer, a vertical section is approximately in a vertical orientation, a horizontal section is approximately in a horizontal orientation, and a diagonal section is in a diagonal orientation, wherein the vertical, horizontal, and diagonal sections form a triangle;
   wherein the vertical section comprises an upper end terminating at a top surface, and a lower end terminating at a bottom surface opposite the upper end, the horizontal section comprises an outboard end and an inboard end opposite the outboard end, and the diagonal section comprises a lower-outboard end and an upper-inboard end opposite the lower-outboard end;
   f) wherein the outboard end of the horizontal section is operatively connected to the upper end of the vertical section, the lower-outboard end of the diagonal section is operatively connected to the lower end of the vertical section, and the inboard end of the horizontal section is operatively connected to the upper-inboard end of the diagonal section, g) wherein a top side of the horizontal section at the outboard end is offset from the top surface of the vertical section by about 1 inch to about 5 inches, h) wherein the lower end of the vertical section is operatively connected to the first beam, and the lower-outboard end of the diagonal section is operatively connected to the first beam, thereby positioning the first beam on an outboard side of the first side underride guard;

i) wherein the inboard end of the horizontal section is operatively connected to the second beam, and the upper-inboard end of the diagonal section is operatively connected to the second beam, thereby positioning the second beam on an inboard side of the first side underride guard;

j) wherein the longitudinal brace comprises a first end and a second end opposite the first end, wherein the first end of the cross brace is operatively connected to the upper end of the vertical section of a first stabilizer, and the second end is operatively connected to the first beam adjacent at the lower end of the vertical section of a second stabilizer; and wherein each vertical section is connected to a respective mounting bracket at the flat surface of the second elongated flange, non-parallel to the flat surface of the first elongated flange of the respective mounting bracket.

2. The side impact guard of claim 1, further comprising a second side underride guard configured as a mirror image of the first underride guard for mounting on a second side of the trailer opposite the first side of the trailer with a space therebetween, wherein the first underride guard is configured to function independently of the second underride guard.

3. The side impact guard of claim 2, wherein the vertical sections of each underride guard have an angle of inward displacement in which the vertical sections are angled medially towards the center of the trailer.

4. An underride guard for mounting to a side of a trailer, the underride guard comprising:

a) a first beam;

b) a second beam parallel to the first beam;

c) a series of repeating stabilizers mounted on the first beam and the second beam, wherein each stabilizer is intermittently spaced apart along the first beam and the second beam; and d) a plurality of mounting brackets operatively connected to each stabilizer;

e) wherein each stabilizer in the series of repeating stabilizers comprises three sections forming a triangular shape, wherein the three sections comprise a vertical section having an upper end and a lower end, a horizontal section having an outboard end and an inboard end, the outboard end connected to the upper end of the vertical section, and a diagonal section connected to the lower end of the vertical section, and the diagonal section connected to the inboard end of the horizontal section, wherein the first beam is adjacent to where the vertical section connects to the diagonal section, and the second beam is adjacent to where the horizontal section connects to the diagonal section;

f) wherein a top side of the diagonal section at the outboard end is offset from a top surface of the vertical section; and g) wherein each mounting bracket is configured for connecting one of the stabilizers to the side of the trailer, wherein each mounting bracket comprises a first elongated flange having a flat surface, and a second elongated flange having a flat surface that is perpendicular to the flat surface of the first elongated flange, wherein the flat surface of the second elongated flange is connected to the top surface of the vertical section of the respective mounting bracket, and wherein each vertical section is non-parallel to the flat surface of the first elongated flange of the respective mounting bracket, thereby forming an angle of inward displacement.

5. The underride guard of claim 4, wherein the offset is about 1 inch to 5 inches.

6. The underride guard of claim 5, wherein the angle of inward displacement is about 5 degrees to about 15 degrees.

7. The underride guard of claim 6, wherein each vertical section has a length of about 15 inches to about 20 inches, each horizontal section has a length of about 10 inches to about 15 inches, and each diagonal section has a length of about 17 inches to about 23 inches.

8. The underride guard of claim 7, further comprising a longitudinal brace operatively connected to the first beam in between two stabilizers.

9. The underride guard of claim 4, wherein the angle of inward displacement is about 5 degrees to about 15 degrees.

10. The underride guard of claim 4, wherein each vertical section has a length of about 15 inches to about 20 inches.

11. The underride guard of claim 4, wherein each horizontal section has a length of about 10 inches to about 15 inches.

12. The underride guard of claim 4, wherein each diagonal section has a length of about 17 inches to about 23 inches.

13. The underride guard of claim 4, further comprising a longitudinal brace operatively connected to the first beam in between two stabilizers.

14. A method of configuring a trailer with a side impact guard, comprising the steps of:

a) providing a first side underride guard, comprising a first beam, a second beam parallel to the first beam, and a series of repeating stabilizers mounted on the first beam and the second beam, wherein each stabilizer is intermittently spaced apart along the first beam and the second beam, wherein each stabilizer in the series of repeating stabilizers comprises three sections forming a triangular shape, wherein the three sections comprise a vertical section, a horizontal section having an outboard end and an inboard end, the outboard end connected to the vertical section, and a diagonal section connected to the vertical section and the horizontal section, wherein the first beam is adjacent to where the vertical section connects to the diagonal section, and the second beam is adjacent to where the horizontal section connects to the diagonal section, wherein a top side of the horizontal section at the outboard end is offset from a top surface of the vertical section; and b) connecting the first side underride guard to a first side of the trailer, the trailer having a longitudinal centerline such that the first side underride guard is configured to move medially toward the longitudinal centerline of the trailer.

15. The method of claim 14, wherein each vertical section is non-parallel to a siderail of the trailer, thereby forming an angle of inward displacement towards the longitudinal centerline.

16. The method of claim 15, wherein the first side underride guard is connected to the siderail of the trailer with a plurality of mounting brackets, wherein one mounting bracket is operatively connected to each stabilizer, wherein each mounting bracket comprises a first elongated flange having a flat surface, and a second elongated flange having a flat surface that is perpendicular to the flat surface of the first elongated flange, wherein the flat surface of the second elongated flange is connected to the top side of the vertical section of the respective mounting bracket.

17. The method of claim 16, wherein the first beam is positioned on an outboard side of the trailer and extends longitudinally parallel to the longitudinal centerline of the trailer, wherein the second beam is position inboard relative to the first beam and extends longitudinally parallel to the longitudinal centerline of the trailer, wherein the second beam is configured to abut against a floor-support crossmembers of the trailer when the first underride side guard moves medially toward the longitudinal centerline of the trailer.

18. The method of claim 17, wherein the first horizontal beam is positioned about sixteen to nineteen inches below a structural siderail of the trailer where the mounting brackets are mounted.

19. The method of claim 18, further comprising connecting a second side underride guard to a second side of the trailer opposite the first side, the second side underride guard configured to move medially toward the longitudinal centerline of the trailer independent of the first side underride guard.

20. The method of claim 19, further comprising connecting a longitudinal brace to the first beam in between two stabilizers.

21. The method of claim 14, wherein the second beam is gapped away from floor-support crossmembers of the trailer vertically by approximately 0.75 inch to approximately 1.5 inch to allow the floor-support crossmembers to deflect from trailer loading independently from the side underride guard.

22. The method of claim 21, wherein the second beam is configured to contact the floor-support crossmembers only when the first beam is deflected inboard.

23. The method of claim 22, wherein upon lateral impact of the side underride guard, the first beam is configured to deflect inboard causing the second beam to deflect upward and contact a bottom flange of at least one of the floor-support crossmembers of the trailer, said bottom flange initially deflecting elastically and subsequently deforming plastically around the second beam in a concave downward manner to form a saddle around the second beam, thereby preventing lateral sliding of the second beam along the bottom flange, beyond frictional resistance, resulting in additional lateral support to the side underride guard that was not present prior to the contact of the second beam with the bottom flange.

24. The method of claim 23, further comprising the step of installing a reinforcing plate on the floor-support cross-member to supplement deforming the cross-member bottom flange to the second beam upon impact of the side underride guard.

25. The method of claim 24, wherein the reinforcing plate is a flat plate comprising a top side, a bottom side opposite the top side, a first lateral side adjacent to the top side and the bottom side, a second lateral side opposite the first lateral side and adjacent to the top side and the bottom side, and a notch defined along the bottom side, wherein the reinforcing plate is installed on the floor-support crossmember such that the notch corresponds with where the second beam contacts the bottom flange upon lateral impact of the side underride guard.

* * * * *